United States Patent

[11] 3,546,385

[72] Inventors Edward S. Ertl
McHenry;
Leslie A. Hannula, Waukegan, Illinois

[21] Appl. No. 665,500
[22] Filed Sept. 5, 1967
[45] Patented Dec. 8, 1970
[73] Assignee Acoustics Development Corporation
Northbrook, Illinois
a corporation of Illinois

[54] COIN TELEPHONE HOUSING AND ASSEMBLY
7 Claims, 5 Drawing Figs.

[52] U.S. Cl. 179/6.3
[51] Int. Cl. H04m 17/02
[50] Field of Search 179/6.3

[56] References Cited
UNITED STATES PATENTS

| | | | |
|---|---|---|---|
| 3,258,535 | 6/1966 | Nawman | 179/6.3 |
| 3,393,273 | 7/1968 | Bustos | 179/6.3 |

*Primary Examiner*—William C. Cooper
*Assistant Examiner*—Jan S. Black
*Attorney*—Parker, Carter & Markey

ABSTRACT: This invention relates to a coin telephone unit and housing, and particularly to an improved assembly for supporting the coin receiver permitting ready access to the interior of the unit. The coin receiver, normally mounted directly on the telephone unit, is mounted above the telephone unit, there being a connecting member supporting the coin receiver. By thus raising the coin receiver, a removable front panel may be utilized in the housing, which removable front panel may be quickly taken out of the housing, for access to the interior of the unit.

INVENTORS.
EDWARD S. ERTL
LESLIE A. HANNULA
BY Parker & Carter
Attorneys.

COIN TELEPHONE HOUSING AND ASSEMBLY

This invention relates to a coin telephone unit and housing, and particularly to an improved unit of the type described permitting ready access to the interior.

A primary purpose of the invention is a coin telephone unit of the type described providing for a separated mounting for the coin receiver, with the coin receiver being positioned above and spaced from the telephone unit.

Another purpose is a telephone unit of the type described including a removable front panel, which may be quickly and easily attached by a pair of spaced elongated adjusting members, positioned on either side of the telephone unit.

Other purposes will appear in the ensuing specification, drawings and claims.

The invention is illustrated diagrammatically in the following drawings wherein.

Figure 1:
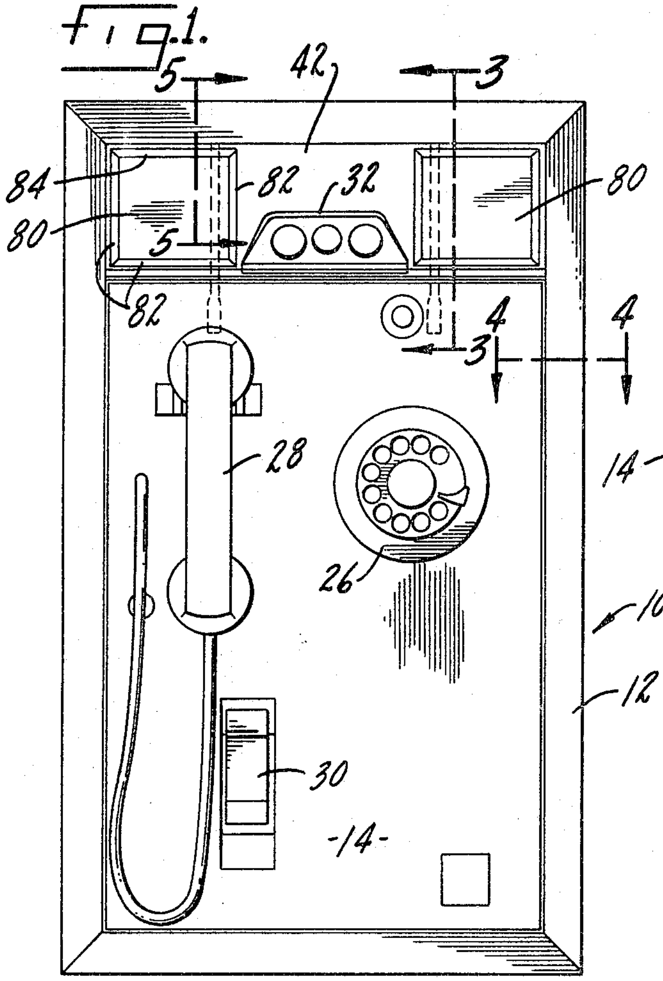
FIG. 1 is a front plan view of a telephone unit of the type described.

In FIG. 1, there is a housing indicated generally at 10 including a peripheral front flange 12. The housing may have a front swinging door 14, a back 16, including angled back walls 18 and 20. There may be sidewalls, one of which is indicated at 22 in FIG. 4, and there may be a top 24 and a bottom, which is not shown. The front door of the housing may mount a conventional dial 26 and a hand receiver 28. There is a coin return box 30 near the bottom of the door 14 and there is a coin receiver 32 near the top of the housing.

Figures 4, 5:
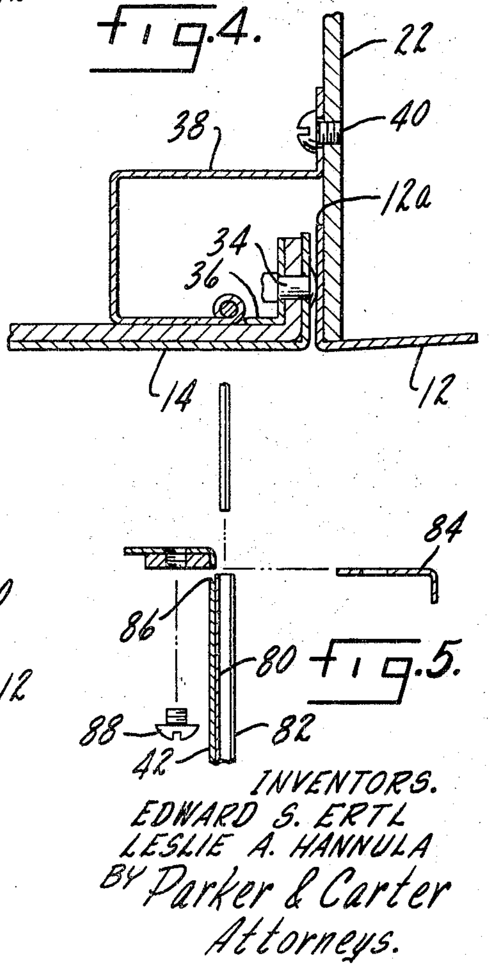
FIG. 4 is a section along plane 4–4 of FIG. 1.
FIG. 5 is a section along plane 5–5 of FIG. 1.
Figure 2:
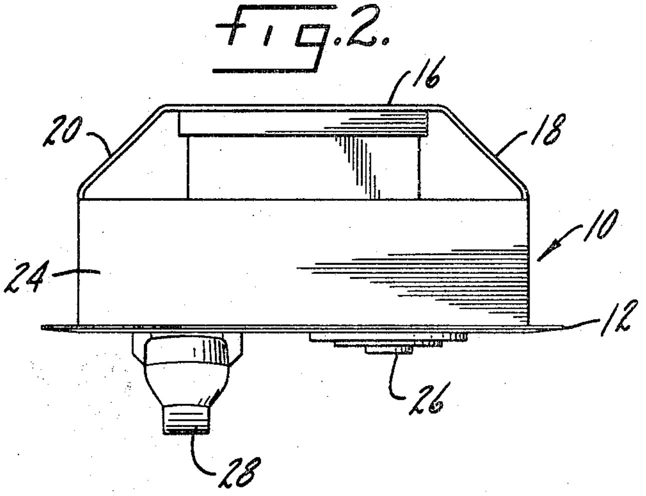
FIG. 2 is a top plan view of the telephone unit illustrated in FIG. 1.

Turning particularly to FIG. 4, the peripheral flange 12 may have an inwardly extending portion 12*a* which extends inside of the sidewall 22 adjacent the head of a fastening member 34, with the fastening member being used to secure the door 14 to hinge member 36. A second hinge member 38 may be held by fastening member 40 to the sidewall 22. The hinge members 36 and 38 may form a conventional hinge assembly.

Figure 3:
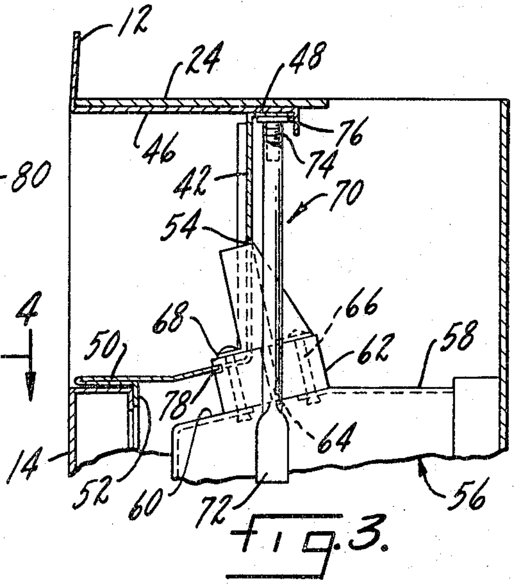
FIG. 3 is a section along plane 3–3 of FIG. 1.

Turning particularly to FIGS. 1 and 3, there may be a removable front plate 42, which is positioned above swinging door 14 at the front of the housing. The removable front plate 42 is recessed within the outline of the housing. The peripheral flange 12, at the top of the housing, has an inwardly directed portion 46, which extends inwardly beyond plate 42, as shown particularly in FIG. 3. A top inwardly extending flange 48 of the front plate 42 is adjacent the inwardly extending portion 46, in the position of FIG. 3, and is normally held in this position when the unit is completely assembled. At its lower edge, the removable plate 42 may include a double flange 50, having a downwardly extending portion 52 which is adjacent the top of the door 14. The portion 52 may provide an inner stop for the door and cooperate with the door in its closed position to lock plate 42. The plate 42 may have an opening 54, which is of the size and shape of the coin receiver 32 so that the coin receiver may extend through this opening and be accessible from the front of the unit. It is important that the coin receiver be recessed inside of the unit and hence, it is for this reason that the removable plate 42 is positioned within the outline of the entire housing.

The telephone unit, which is positioned inside of the housing, is indicated at 56 in FIG. 3 and may have a top 58 with a forwardly and downwardly slanting wall 60. As is conventional, there is a coin slot at the top of the slanting wall 60 for receiving the coins. Mounted on the forwardly and downwardly slanted wall 60 is a supporting member or mounting member or blocklike member 62 which has a generally central passage 64 in alignment with the coin opening in the top of the telephone unit 56. There will be the same number of passages 64 as there are coin openings. Screws or the like 66 may be used to fasten the member 62 to the top of the telephone unit 56. The coin receiver 32 has forwardly and backwardly extending flanges 68 which are used to mount the coin receiver on top of the member 62. Screws 66 go through these flanges. Again, as is conventional, if there are three coin openings in the coin receiver, each of these coin openings will be in alignment with an individual passage 64 in the element 62, so that the coins from the receiver will pass downwardly through the passages and into the telephone unit proper. In the alternative there may be one continuous passage. Only by providing the element 62 is it possible to position the coin receiver such that it can be accessible from the front and at the level of the plate 42.

The plate 42 is held in position snugly up against the inwardly directed portion 46 by means of a pair of elongated fastening members indicated generally at 70. These fastening members include elongated handles 72, threaded onto lugs or the like 74 fastened onto element 24. The handles 72 are internally threaded so that they may drive an apertured washer 76 upwardly against the top of plate 42 to firmly hold this plate within the housing.

The invention is particularly adapted to provide a coin telephone unit in which the coin receiver or coin gauge is readily accessible for use and in which there is ready access to the interior of the housing. The door 14 may be swung open, after which the fastening members 72 may be backed off or released so that the plate 42 can be removed. Note that the plate 42 has a portion which extends into a front and side opening groove 78 on the member 62 to further fasten and align the plate in its proper position. As soon as the plate has been removed, there is complete access to any part of the telephone assembly.

There may be a pair of card holders 80 on each side of the coin receiver 32 for displaying inserts with information helpful to the phone user. The card holders 80 are attached to plate 42 and have bottom and side flanges 82 for positioning a card. A removable top member 84 slides through a slot 86 in plate 42 after a card is in place. A screw 88 can be used to hold top member 84 in position and attached to plate 42. After assembly it is impossible to remove a card from the front. The screw 88, which is behind plate 42, must first be removed to free top member 84.

In a sense, the improved arrangement of parts provides simplified construction, a construction which is rugged and durable and which provides positive security precautions against theft.

Whereas the preferred form of the invention has been shown and described herein, it should be realized that there are many modifications, substitutions and alterations thereto within the scope of the following claims.

We claim:

1. In a pay telephone assembly, a housing, a telephone unit within said housing, at least one coin opening in an upper portion of said telephone unit, a coin receiver, an independent support member mounted on said telephone unit in alignment with said coin opening for supporting said coin receiver, at least one coin passage in said independent support member in alignment with said coin opening and said coin receiver, said housing including a removable plate positioned generally at the upper front of said housing, interconnecting means between said removable plate and said independent support member to align said plate and support member within said housing, including a groove in said support member with a portion of said plate extending into said groove, an opening in said plate of the size and shape of said coin receiver, and means fixed on said housing for removably fastening said plate to said housing.

2. The structure of claim 1 further characterized in that said housing includes a pivotally mounted door, said door being positioned below said removable plate, with the opening of said door permitting access to said telephone unit.

3. The structure of claim 1 further characterized in that said removable plate and coin receiver are recessed inside the housing.

4. The structure of claim 1 further characterized by and including a pair of card holders attached to said plate on either side of said coin receiver, each of said card holders including a removable portion for use in preventing removal of the card.

5. The structure of claim 4 further characterized in that said removable portion extends through and is fastened to said plate.

6. In a pay telephone assembly, a housing, a telephone unit within said housing, at least one coin opening in an upper portion of said telephone unit, a coin receiver, means mounted on said telephone unit in alignment with said coin opening for supporting said coin receiver, at least one coin passage in said supporting means, in alignment with said coin opening and said coin receiver, said housing including a removable plate positioned generally at the upper front of said housing, an opening in said plate of the size and shape of said coin receiver, and means fixed on said housing for removably fastening said plate to said housing and including a plurality of elongated adjusting members extending downwardly from the upper end of said housing, with said adjusting members being arranged to bias said removable plate upwardly against the top of said housing.

7. The structure of claim 6 further characterized in that there are a pair of said adjusting members, spaced on either side of said telephone unit.